United States Patent
Kodama et al.

(10) Patent No.: US 8,229,576 B2
(45) Date of Patent: Jul. 24, 2012

(54) FIELD DEVICE MANAGEMENT APPARATUS AND FIELD DEVICE MANAGEMENT SYSTEM

(75) Inventors: Kazutoshi Kodama, Musashino (JP); Hiroaki Kanokogi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 223 days.

(21) Appl. No.: 12/506,918

(22) Filed: Jul. 21, 2009

(65) Prior Publication Data

US 2010/0023140 A1   Jan. 28, 2010

(30) Foreign Application Priority Data

Jul. 22, 2008 (JP) .............................. P. 2008-188189

(51) Int. Cl.
- G05B 11/01 (2006.01)
- G05B 15/00 (2006.01)
- G06F 9/445 (2006.01)
- G06F 15/177 (2006.01)
- G06F 3/00 (2006.01)

(52) U.S. Cl. ............ 700/17; 700/83; 717/174; 715/735; 715/736; 715/762; 710/16

(58) Field of Classification Search ............... 700/17, 700/83; 717/174; 715/735–736, 762; 710/16
See application file for complete search history.

(56) References Cited

U.S. PATENT DOCUMENTS

| | | | |
|---|---|---|---|
| 6,618,630 B1 * | 9/2003 | Jundt et al. | 700/17 |
| 7,983,892 B2 * | 7/2011 | Anne et al. | 703/22 |
| 8,108,200 B2 * | 1/2012 | Anne et al. | 703/23 |
| 2004/0193287 A1 * | 9/2004 | Lefebvre et al. | 700/1 |
| 2004/0230582 A1 * | 11/2004 | Pagnano et al. | 707/100 |
| 2007/0067767 A1 * | 3/2007 | Da Silva Neto | 717/174 |
| 2007/0075916 A1 * | 4/2007 | Bump et al. | 345/3.1 |
| 2007/0078956 A1 * | 4/2007 | VanGompel | 709/220 |
| 2007/0079250 A1 * | 4/2007 | Bump et al. | 715/762 |
| 2008/0112388 A1 * | 5/2008 | Garrett et al. | 370/351 |
| 2008/0222662 A1 * | 9/2008 | Gunzert | 719/321 |
| 2008/0313629 A1 * | 12/2008 | Vetter et al. | 717/174 |
| 2009/0049207 A1 * | 2/2009 | Reynolds et al. | 710/16 |
| 2009/0177970 A1 * | 7/2009 | Jahl et al. | 715/735 |
| 2009/0292996 A1 * | 11/2009 | Anne et al. | 715/736 |

OTHER PUBLICATIONS

Extended European Search Report issued for EP-09165851.8-1239, dated Oct. 30, 2009.
Hans-Herman Dirxen; "FTD/DTM for Foundation Fieldbus"; XP002550612; Apr. 2005; pp. 1-5.
Prof. Dr.-Ing habil. Peter Neumann, et al.; "Field Device Integration"; Emerging Technologies and Factory Automation; 2001; XP010589079, ISBN: 978-0-7803-7241-2; vol. 2, pp. 63-68.
Hirooka Isao, et al.; "Field device Management Tool of New Era, Field Mate", Yokogawa Technical Report; vol. 51, No. 2, 2007; pp. 45-49.

* cited by examiner

Primary Examiner — Ronald Hartman, Jr.
(74) Attorney, Agent, or Firm — Sughrue Mion, PLLC

(57) ABSTRACT

There is provided a field device management apparatus for acquiring and managing device information about a field device. The apparatus includes: a device information description unit having: an activation processing algorithm that activates a device information processing algorithm for acquiring the device information from the field device; and a description information that describes the device information; and a device information acquisition control unit that activates the device information processing algorithm using the activation processing algorithm so as to acquire the device information through the device information description unit.

10 Claims, 7 Drawing Sheets

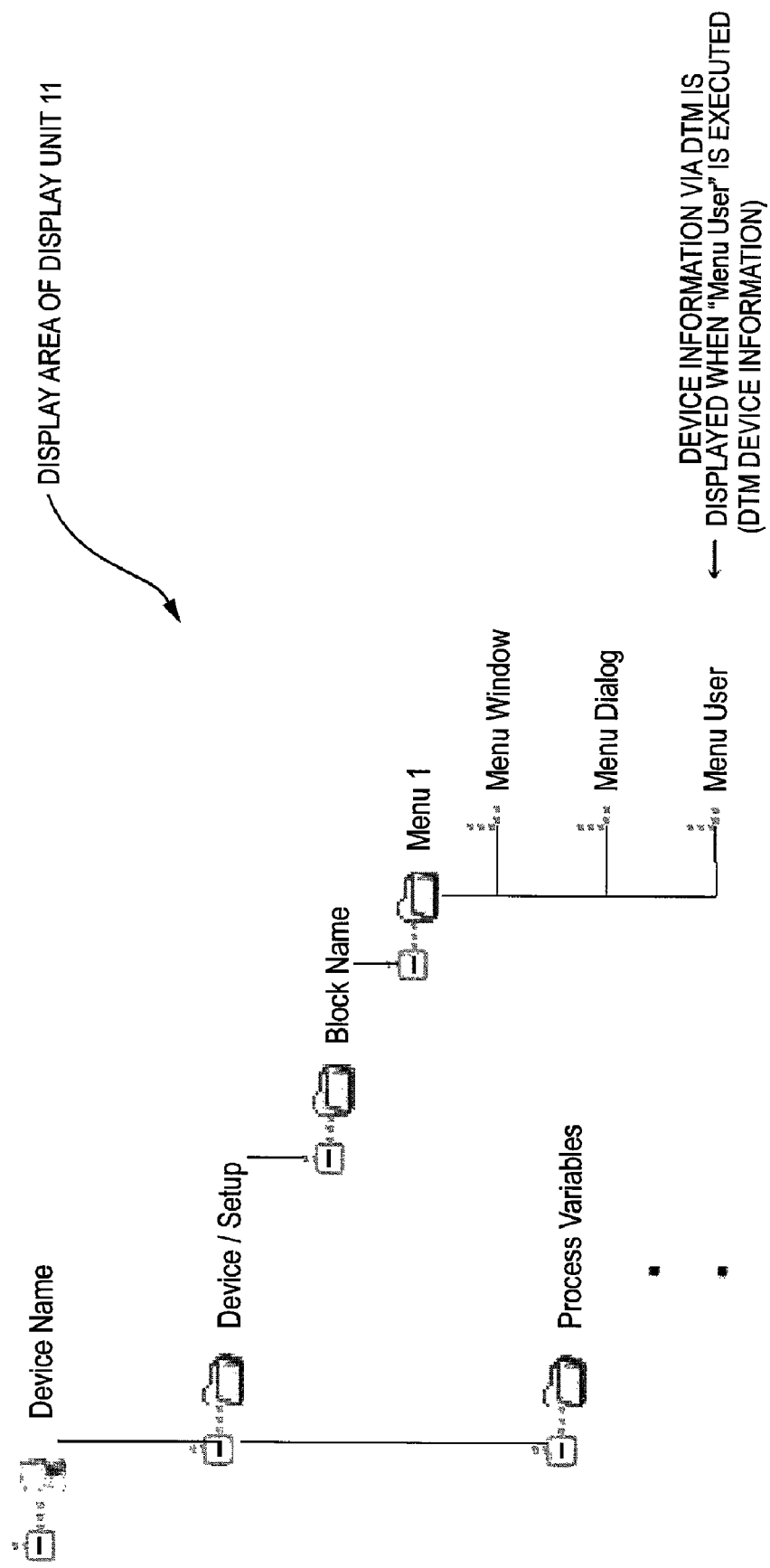

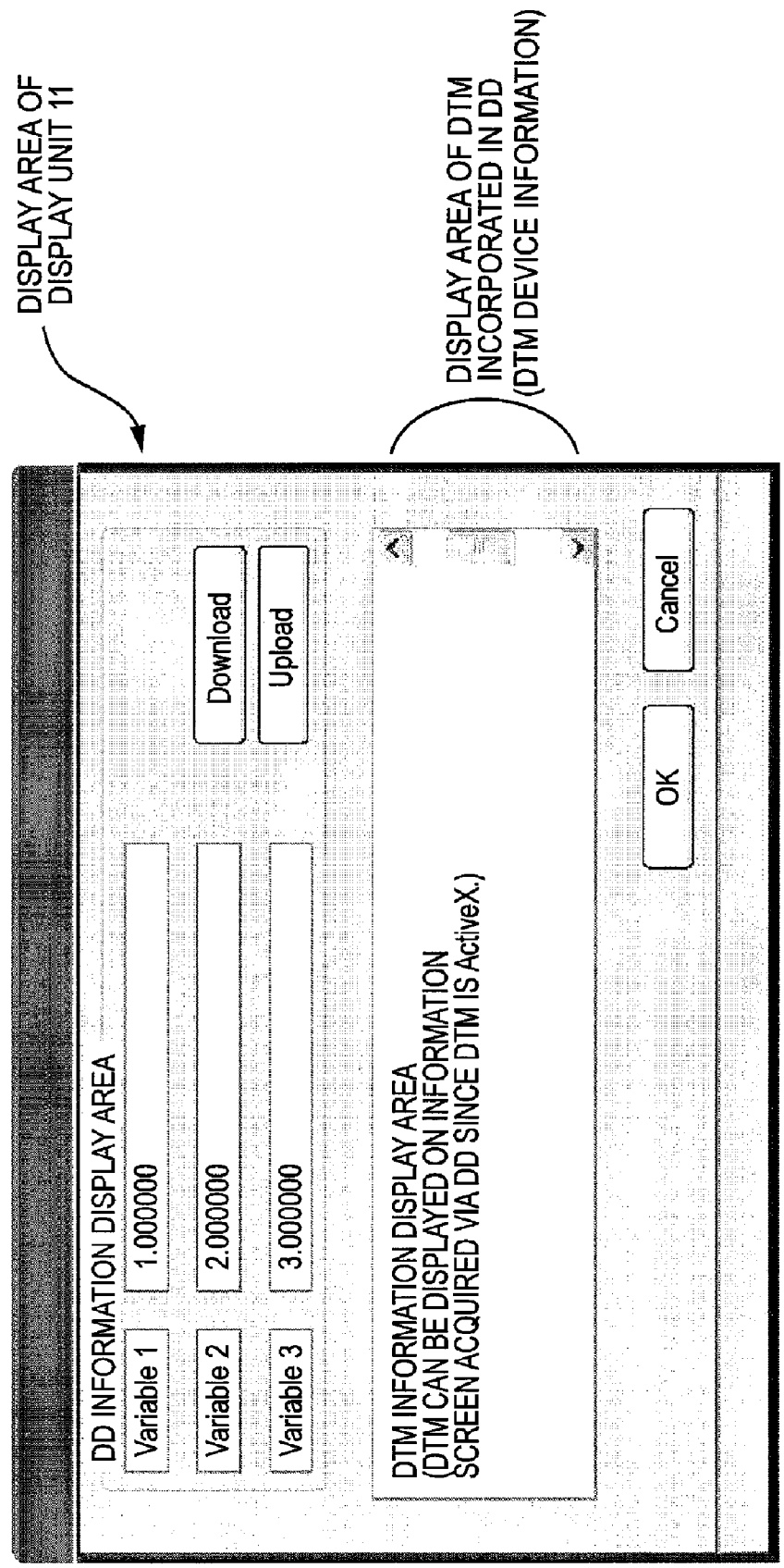

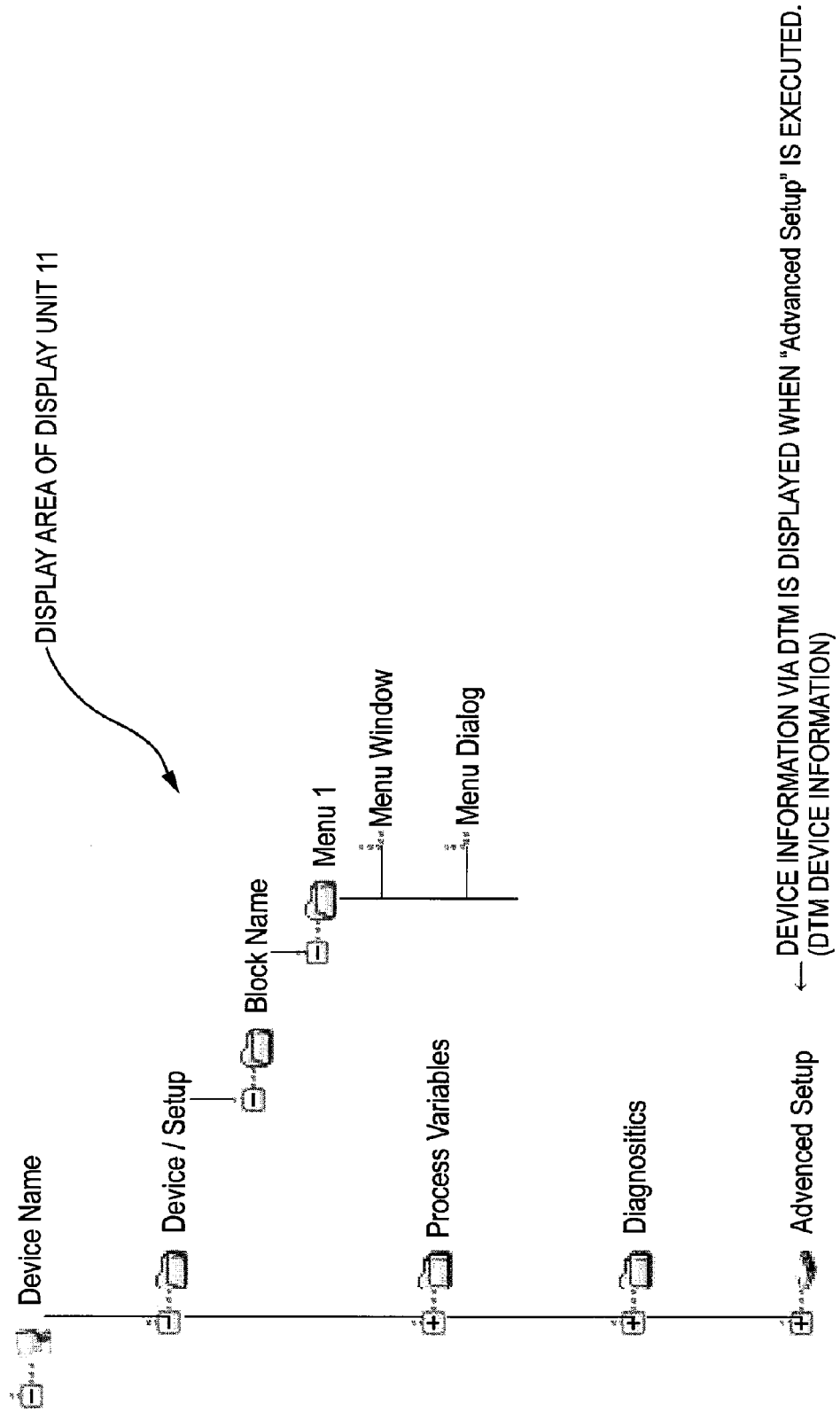

FIELD DEVICE MANAGEMENT APPARATUS AND FIELD DEVICE MANAGEMENT SYSTEM

This application claims priority from Japanese Patent Application No. 2008-188189, filed on Jul. 22, 2008, the entire contents of which are incorporated by reference herein.

BACKGROUND OF THE INVENTION

1. Technical Field

The present disclosure relates to a field device management apparatus for managing device information about a field device and a field device management system including the field device management apparatus. More particularly, the present disclosure relates to a field device management apparatus for integrating applications related to device information management.

2. Related Art

A field device management apparatus communicates with a field device used for process control in a chemical plant or the like and also acquires device information (e.g., a device parameter, individual information (e.g., a serial number) or a device tag) about the field device and performs field device management such as parameter setting, device adjustment or maintenance work. Also, the field device management apparatus acquires and manages the device information, using device description (DD) specifications and device type manager (DTM) specifications.

Such a field device management apparatus will be described with reference to FIG. 5. FIG. 5 is a configuration diagram of a field device management system 4. The field device management system includes a field device management apparatus 1, a communication path 2 and a field device 3.

In FIG. 5, the field device management apparatus 1 includes: an input unit 10; a display unit 11; an user application processing unit 20; a DD application processing unit 30; a virtual communication unit 40; a device description (DD) 51 (hereinafter, referred as to "DD 51") having a description information 50; a DTM application processing unit 55; a device type manager (DTM) 60; and a communication unit 70, Also, the communication unit 70 is connected to the field device 3 through the communication path 2.

The DD 51 has the description information 50 in which device information such as a parameter of the field device 3 and a definition of an access method to the device information are described. Also, in case where information processing is varied depending on a device status with respect to a parameter (for example, conditional branch processing), the DTM 60 is constructed of an algorithm (program) for executing this information processing. Then, the field device management apparatus 1 acquires device information using the DD 51 as well as the DTM 60.

Since the DD 51 is described by a script language, it is difficult to perform complicated processing such as the conditional branch processing described above, whereas a manufacturer can reduce a development burden. Thus, such a complicated processing is implemented using the DTM 60 utilizing ActiveX (registered trademark) control.

Next, an action in which the field device management apparatus 1 acquires device information from the field device 3 will be described hereinafter. The user application processing unit 20 first receives a device information acquisition request signal from a user 80 through the input unit 10 (a keyboard, a mouse, etc.).

In the case of acquiring device information using DD specifications, the DD application processing unit 30 receives the device information acquisition request signal from the user application processing unit 20. The DD application processing unit 30 reads the description information 50 about the DD 51 through the virtual communication unit 40. Then, according to a definition described in the description information 50, the DD application processing unit 30 communicates with the field device 3 through the DD 51, the communication unit 70 and the communication path 2, and then acquires the device information from the field device 3.

Then, the user application processing unit 20 receives the device information acquired by the DD application processing unit 30, and then displays display data of this device information on the display unit 11 (a CRT, a liquid crystal display, etc.).

Also, in the case of acquiring device information using DTM specifications, the DTM application processing unit 55 receives the device information acquisition request signal from the user application processing unit 20. The DTM application processing unit 55 activates the DTM 60, and the DTM 60 communicates with the field device 3 through the communication unit 70 and the communication path 2, and then acquires the device information from the field device 3.

Then, the user application processing unit 20 receives the device information acquired by the DTM application processing unit 55, and then displays display data of this device information on the display unit 11.

In addition, in the following document, a field device management apparatus in connection with device description (DD) specifications and device type manager (DTM) specifications is described, (see e.g., Isao Hirooka et al.: "Field Device Management Tool of New Era, Field Male", Yokogawa Technical Report, Yokogawa Electric Corporation, May 20, 2007, Vol. 51 No. 2 (2007), p. 45-48).

By the way, in the case of acquiring device information from the field device 3, it is necessary for the user to separately operate the DD application processing unit 30 and the DTM application processing unit 55 in accordance with the device information. Thus, it becomes complicated and confusion may be caused. Also, the DD specifications differ from the DTM specifications in a display format of the device information. Thus, this may also cause complication and confusion for the user.

Further, it is necessary for a manufacturer to create separate applications for the DD application processing unit 30 and the DTM application processing unit 55, and thus the manufacturer has large development burden and development cost of these applications.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a field device management apparatus for integrating user applications and a field device management system including the field device management apparatus.

According to one or more illustrative aspects of the present invention, there is provided a field device management apparatus for acquiring and managing device information about a field device. The apparatus comprises: a device information description unit having: an activation processing algorithm that activates a device information processing algorithm for acquiring the device information from the field device; and a description information that describes the device information; and a device information acquisition control unit that activates the device information processing algorithm using the activation processing algorithm so as to acquire the device information through the device information description unit.

According to one or more illustrative aspects of the present invention, there is provided a field device management apparatus for acquiring and managing device information about a filed device. The apparatus comprises: a device information description unit having a description information that describes the device information; an user application processing unit having an activation processing algorithm that activates a device information processing algorithm for acquiring the device information from the field device; and a device information acquisition control unit that receives the activation processing algorithm from user application processing unit and activates the device information processing algorithm using the activation processing algorithm so as to directly acquire the device information According to one or more illustrative aspects of the present invention, there is provided a field device management system. The field device management system comprises: the field device management apparatus; and the field device that communicates with the field device management apparatus through a communication path.

According to one or more illustrative aspects of the present invention, there is provided a computer-readable medium having a computer program stored thereon and readable by a computer. The computer program, when executed by the computer, causes the computer to perform operations which the field device management apparatus.

BRIEF DESCRIPTION OF THE DRAWINGS

FIGS. 4A and 4B are display screens which are displayed by the display unit of the field device management apparatus of FIG. 1;

FIG. 4C is a display screen which is displayed by the display unit of the field device management apparatus of FIG. 3.

DESCRIPTION OF EXEMPLARY
EMBODIMENTS OF THE INVENTION

Exemplary embodiments of the present invention will be now described with reference to the drawings.

Figure 1:
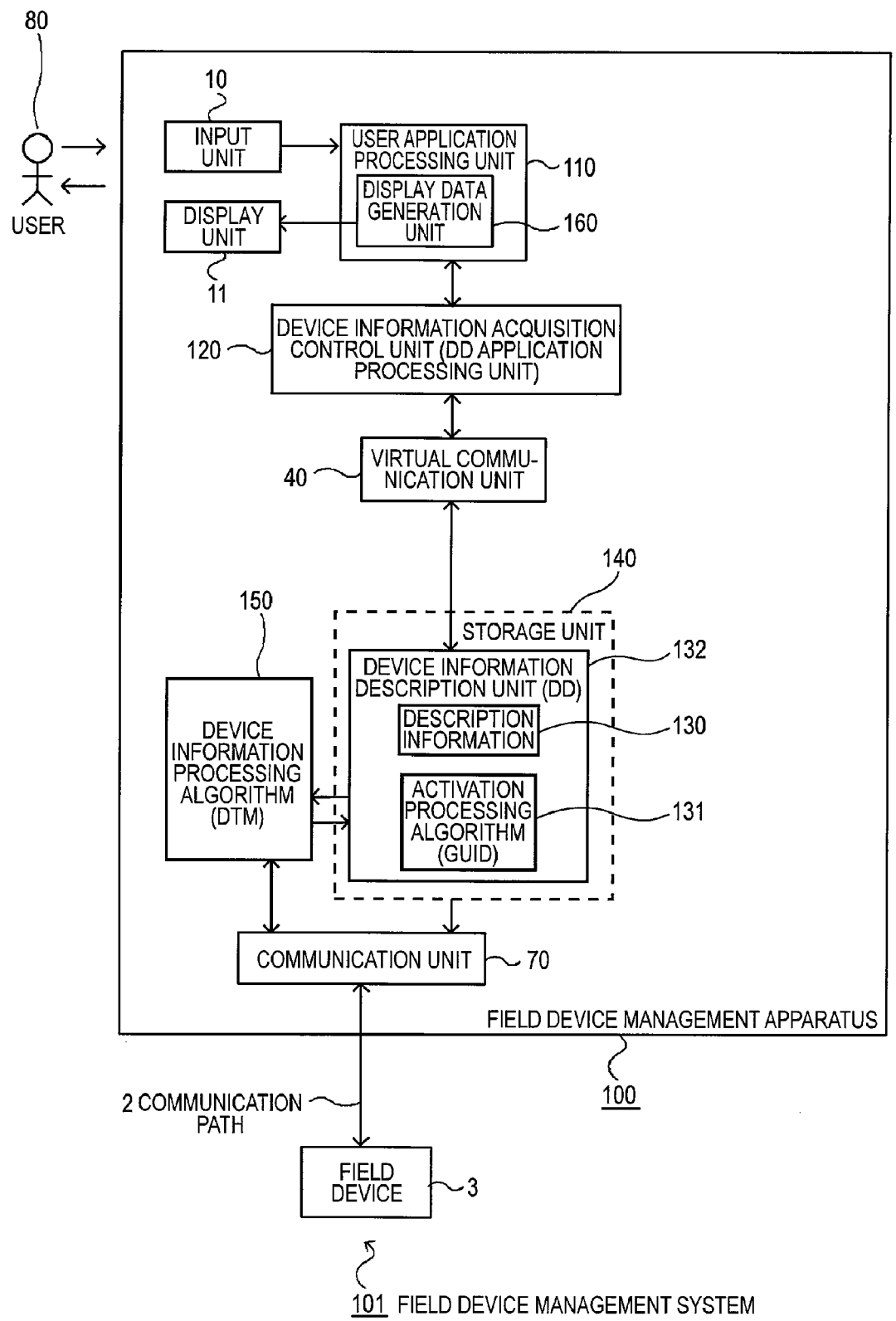
FIG. 1 is a configuration diagram showing a field device management system including a field device management apparatus according to an exemplary embodiment of the present invention.
Figure 5:
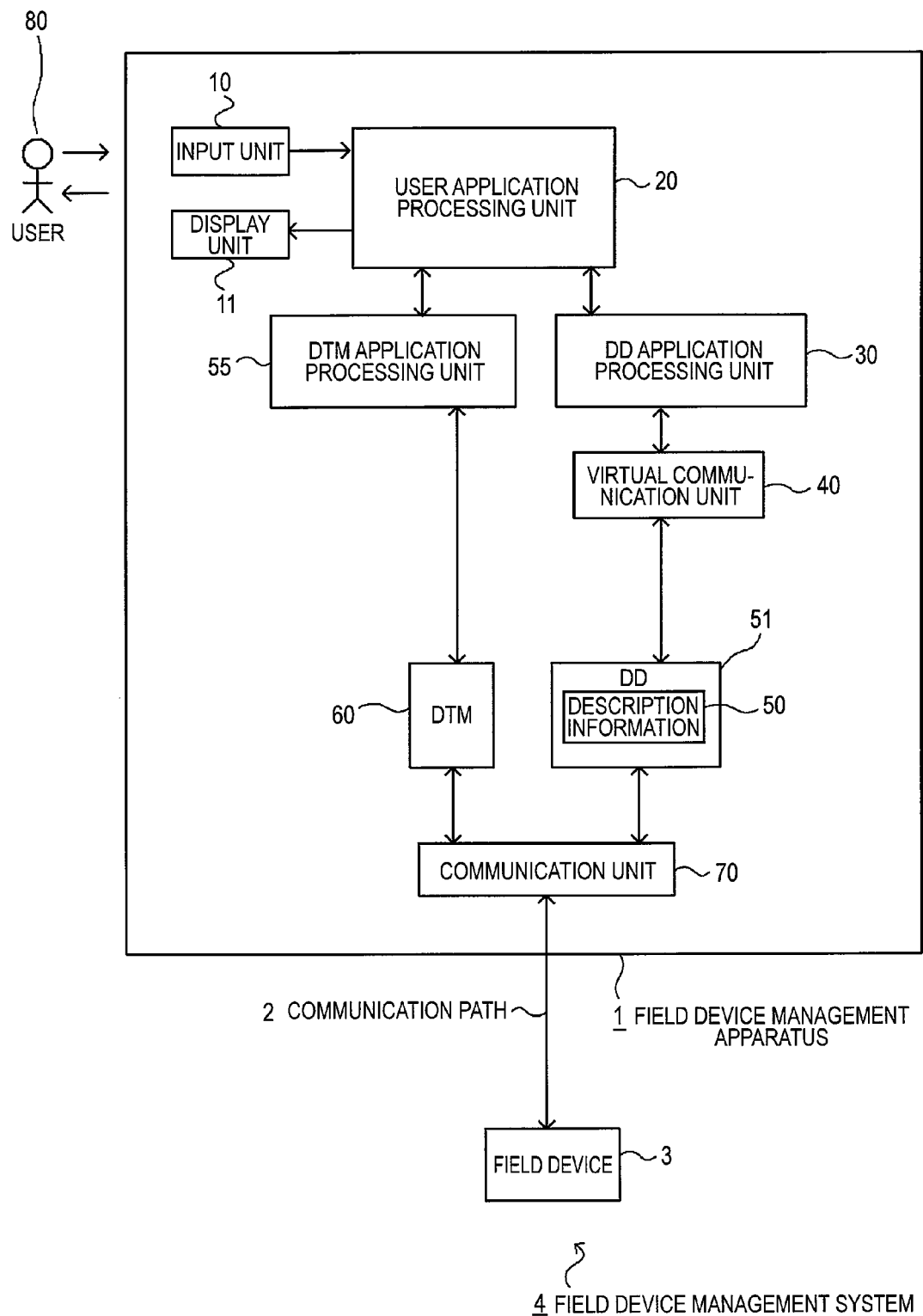
FIG. 5 is a configuration diagram showing a device management system including a related-art field device, management apparatus.

FIG. 1 is a configuration diagram showing a field device management system 101. The field device management system 101 includes: a field device management/apparatus 100; a communication path 2; and a field device 3. The same numerals are assigned to the same components as those of FIG. 5 and the explanation is omitted here.

In FIG. 1, the field device management apparatus 100 includes: an input unit 10; a display unit 11; a user application processing unit 110; a device information acquisition control unit (DD application processing unit) 120; a virtual communication unit 40; a device information description unit (DD) 132 having description information 130 and an activation processing algorithm (GUID) 131; a storage unit 140 such as a memory; a device information processing algorithm (DTM) 150; a display data generation unit 160; and a communication unit 70.

An output of the input unit 10 is inputted to the user application processing unit 110 and display data are outputted from the display data generation unit 160 to the display unit 11. The user application processing unit 110 and the device information acquisition control unit. (DD application processing unit) 120 communicate with each other.

The. device information acquisition control unit (DD application processing unit) 120 and the device information description unit (DD) 132 communicate with each other through the virtual communication unit 40. The device information description unit (DD) 132 and the device information processing algorithm (DTM) 150 communicate with each other. The device information description unit (DD) 132 and the device information processing algorithm (DTM) 150 communicate (wire or wireless communication) with the field device 3 through the communication unit 70 and the communication path 2.

Here, the device information description unit (DD) 132 is defined using device description (DD) specifications and the device information processing algorithm (DTM) 150 is defined using device type manager (DTM) specifications. The description information 130 is description information similar to the description information 50 of FIG. 5 and the device information processing algorithm (DTM) 150 is an algorithm similar to the DTM 60 of FIG. 5.

Since the device information processing algorithm (DTM) 150 uses a Component Object Model (COM) interface, the activation processing algorithm (GUID) 131 can activate the device information processing algorithm (DTM) 150 when a GUID (Globally Unique Identifier) is used in the activation processing algorithm (GUID) 131. Also, Style of an item, type of MENU can define GUID in USER and it may be defined in an area in which-a user of user string can freely write a character string therein.

In addition, the description information 130 and the activation processing algorithm (GUID) 131 may be stored in the storage unit 140 and also the device information processing algorithm (DTM) 150 may be stored in the storage unit 140. Also, the display data generation unit 160 may be provided in the user application processing unit 110 or may be provided separately. The communication unit 70 is connected to the field device 3 through the communication path 2.

Figure 2:
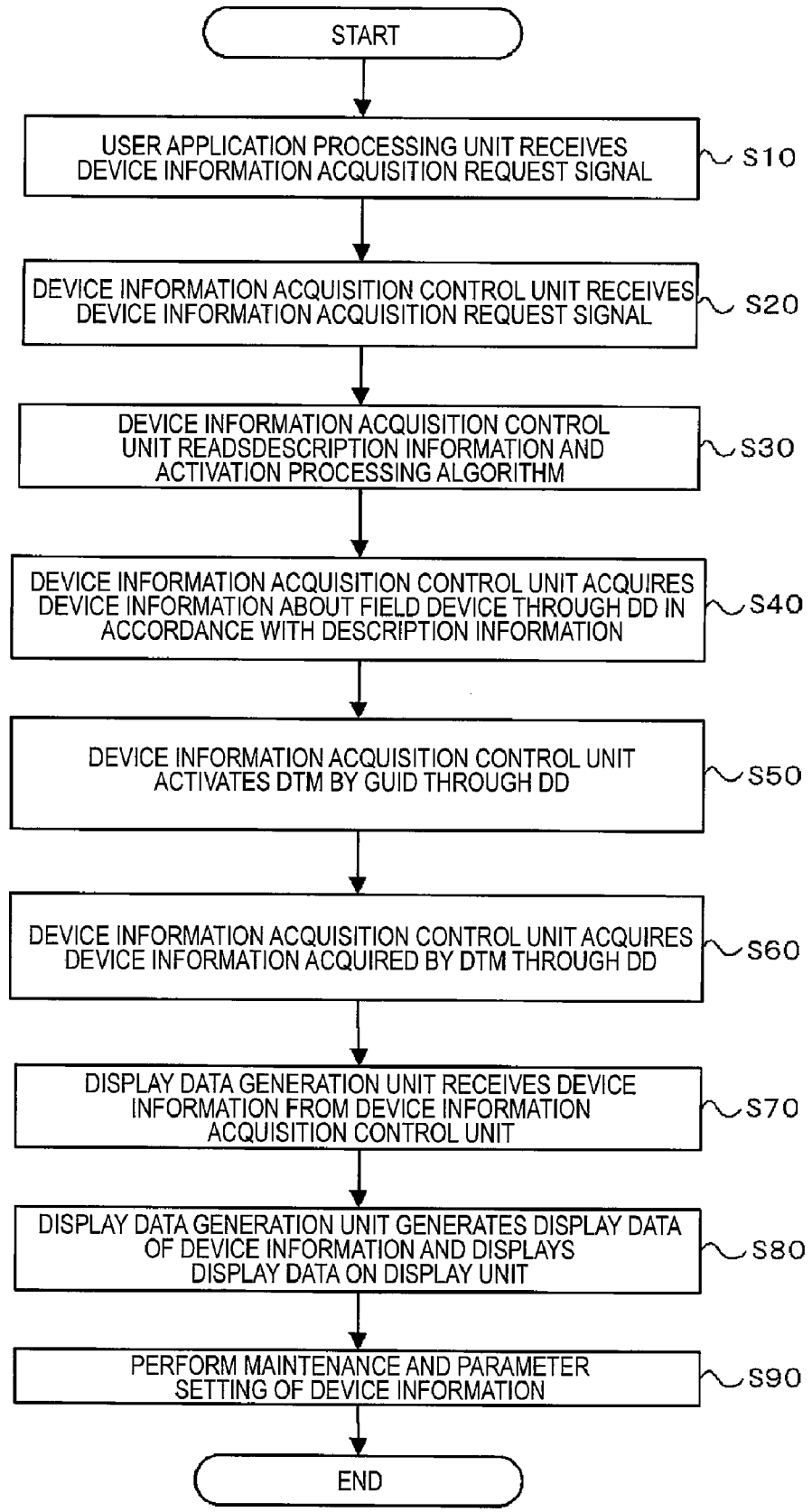
FIG. 2 is a flowchart showing an action of the field device management apparatus of FIG. 1.

Next, an action in which the field device management apparatus 100 acquires device information from the field device 3 will be described with reference to FIG. 2. FIG. 2 is a flowchart describing an operation of the field device management apparatus 100.

In FIG. 2, the user application processing unit 110 receives a device information acquisition request signal from the user 80 through the input unit 10 in accordance with a user application program (not shown) stored in the storage unit 140 (step S10).

Thereafter, the device information acquisition control unit (DD application processing unit) 120 receives the device information acquisition request signal from the user application processing unit 110 in accordance with a DD application program (not shown) stored in the storage unit 140 (step S20).

Thereafter, the device information acquisition control unit (DD application processing unit) 120 reads the description information 130 and the activation processing algorithm (GUID) 131 through the virtual communication unit 40 (step S30).

Thereafter, according to a definition described in the description information 130, the device information acquisition control unit (DD application processing unit) 120 communicates with the field device 3 through the device information description unit (DD) 132, the communication unit 70 and the communication path 2, and then acquires the device information from the field device 3 (step S40). In addition, the device information acquired in step S40 means device information described in the description information 130 and thus is hereinafter called "DD device information" for simplicity.

Thereafter, the device information acquisition control unit (DD application processing unit) 120 activates the device information processing algorithm (DTM) 150 by using the activation processing algorithm (GUID) 131 through the device information description unit (DD) 132 (step S50).

Thereafter, the device information processing algorithm (DTM) 150 communicates with the field device 3 through the communication unit 70 and the communication path 2, and then acquires the device information from the field device 3. Then, the device information acquisition control unit (DD application processing unit) 120 acquires the device information acquired by the device information processing algorithm (DTM) 150 through the device information description unit (DD) 132 (step S60). In addition, the device information acquired in step S60 means device information acquired by the device information processing algorithm (DTM) 150 and thus is hereinafter called "DTM device information" for simplicity.

Thereafter, the display data generation unit 160 receives the DD device information and the DTM device information from the-device information acquisition control unit (DD application processing unit) 120 (step S70).

Thereafter, according to a display data generation application program (not shown) stored in the storage unit 140, the display data generation unit 160 generates display data of the DD device information and the DTM device information and then displays the display data on the display unit 11 (step S80).

Thereafter, the device information acquisition control unit (DD application processing unit) 120 performs parameter setting, device adjustment, maintenance work, etc. through the device information description unit (DD) 132 and the device information processing algorithm (DIM) 150 (step S90).

Figure 3:
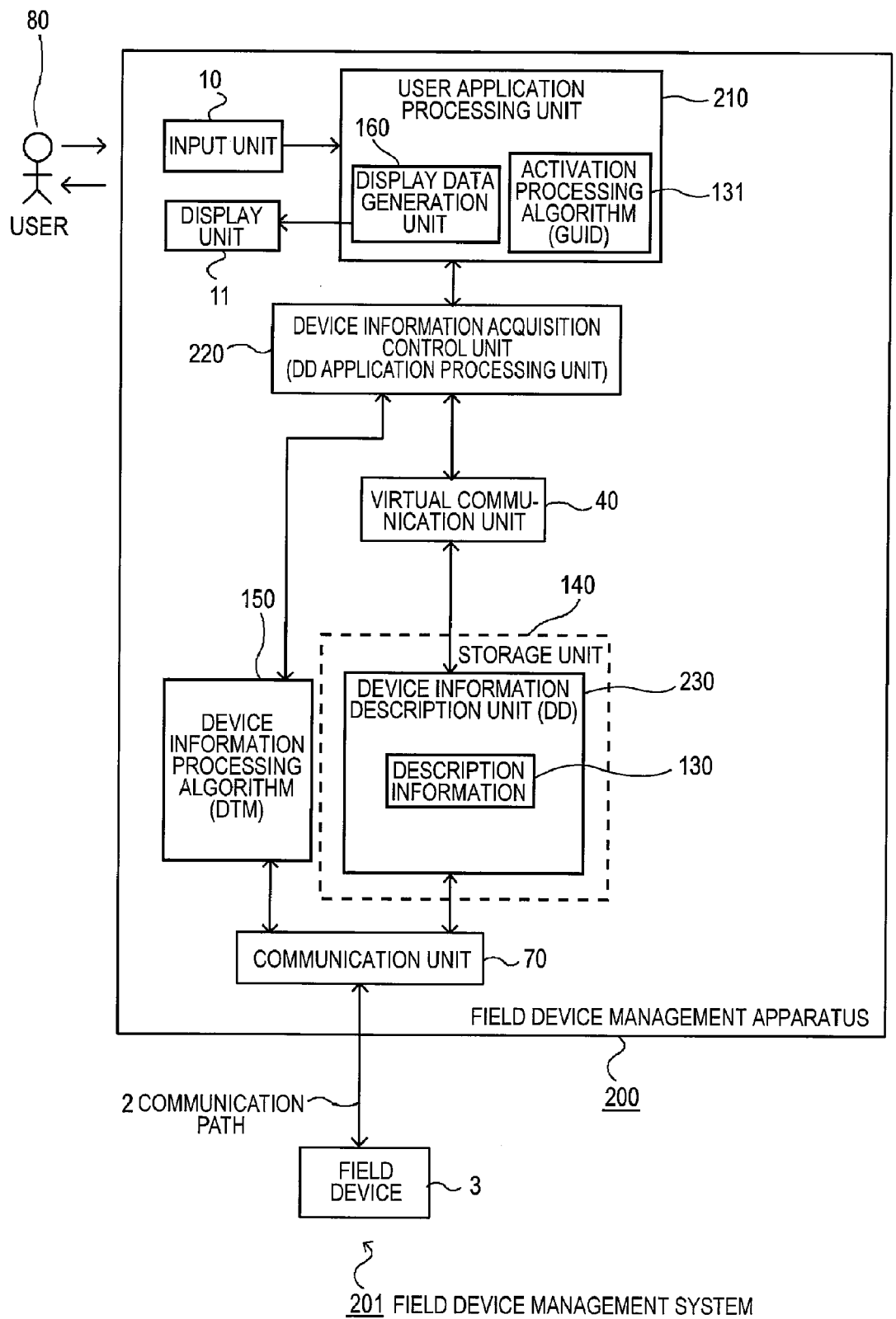
FIG. 3 is another configuration diagram showing a field device management system including a field device management apparatus according to an exemplary embodiment of the present invention.

Next, another configuration of the field device management apparatus will be described with reference to FIG. 3. FIG. 3 is a configuration diagram showing a field device management system 201 that includes a field device management apparatus 200, a communication path 2 and a field device 3. The same numerals are assigned to the same components as those of FIG. 1 and the explanation is omitted here. Also, Differences between FIG. 1 and FIG. 3 will be described mainly.

In FIG. 3, user application processing unit 210 includes a display data generation unit 160 and an activation processing, algorithm (GUID) 131. A device information description unit (DD) 230 includes a description information 130 and may not include me activation processing algorithm (GUID) 131. Also, a device information acquisition control unit (DD application processing unit) 220 directly communicates with a device information processing algorithm (DTM) 150.

An action in which the field device management apparatus 200 acquires device information from the field device 3 will be now described. First, the user application processing unit 210 and the device information acquisition control unit (DD application processing unit) 220 are activated by the user 80.

Thereafter, the device information acquisition control unit (DD application processing unit) 220 receives the activation processing algorithm (GUID) 131 from the user application processing unit 210 at the time of its own activation. For example, the user application processing unit 210 can add the activation processing algorithm (GUID) 131 into an argument of a command line and send the activation processing algorithm (GUID) 131 to the device information acquisition control unit (DD application processing unit) 220.

Thereafter, the device information acquisition control unit (DD application processing unit) 220 directly activates the device information processing algorithm (DTM) 150 using the activation processing algorithm (GUID) 131 and directly acquires device information (DTM device information) acquired by the device information processing algorithm. (DTM) 150. In addition, DD device information is acquired in a manner similar to step S40 of FIG. 2, and display data are generated in a manner similar to steps S70 and S80 of FIG. 2.

Next, a display example of display data will be described with reference to FIGS. 4A to 4C. FIGS. 4A to 4C are display screens displayed in a display area of the display unit 11. FIGS. 4A and 4B are display screens which are displayed by the display unit 11 of the field device management apparatus 100 of FIG. 1, and FIG. 4C is a display screen which is displayed by the display unit 11 of the field device management apparatus 200 of FIG. 3.

The display data generation unit 160 generates display data in which the DD device information and the DTM device information are displayed in the same display area of the display unit 11. Consequently, a display screen of the display unit 11 is shown in FIG. 4A.

In FIG. 4A, DD device, information is displayed in the form of a hierarchical structure (tree structure) as fundamental (basic) display. In the lower-level of this hierarchical structure, DTM device information is displayed as "Menu User".

Also, as another example, in FIG. 4B, the DTM device information (see the lower box) is displayed in a display frame (see the whole display frame) of DD device information.

Further, as still another example, in FIG. 4C, in a manner similar to FIG. 4A, the DD device information is displayed in the form of a hierarchical structure as fundamental display. In the higher-level of this hierarchical structure, the DTM device information is displayed as "Advanced Setup".

According to the present embodiment, the device information acquisition control unit (DD application processing unit 120) can activate a device information processing algorithm (DTM) using an activation processing algorithm (GUID) provided in the user application processing unit 210 or device information description unit (DD) and acquires device information acquired by this device information processing algorithm (DTM) as well as device/information defined in description information.

Consequently, user applications can be integrated into the device information acquisition control unit (DD application processing unit 120), so that the user can perform device information acquisition, parameter setting, device adjustment, maintenance work, etc. while viewing the display contents of an integrated display form using one application (for example, DD device information and DTM device information are shown in the same hierarchical structure as shown in FIG. 4A) Also, the user can reduce complication and confusion. Also, a manufacturer has only to create one application, so that the manufacturer can reduce a development cost and a development burden.

Also, the development burden and development cost of DTM are larger than those of DD. As a result of this, a manufacturer can reduce the development burden and the development cost of DTM by increasing DD device information and minimizing DTM device information.

In addition, the field device 3 is a device compliant with foundation field bus, profibus, hart (registered trademark), or the like, and the field device management apparatus may manage device information about plural field devices.

Also, for example, the user application processing unit 110, 210, the device information acquisition control unit (DD application processing unit) 120, 220, the virtual communication unit 40 and the display data generation unit 160 can be implemented by a processor for executing a program and may also be implemented by a logical circuit etc.

As another exemplary embodiment, the present invention can be implemented by a computer-readable medium having a computer program stored thereon and readable by a computer. For example, the computer program, when executed by the computer, causes the computer to perform operations described in the above embodiment (see e.g., the flowchart shown in FIG. 2).

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A field device management apparatus for acquiring and managing device information about a field device, the apparatus comprising:
   a device information description unit having:
      an activation processing algorithm that activates a device information processing algorithm at a device type manager for acquiring the device information from the field device; and
      a description information that describes the device information; and
   a device information acquisition control unit that activates the device information processing algorithm that is at the device type manager using the activation processing algorithm so as to acquire the device information through the device information description unit, wherein the device information acquisition control unit acquires the device information by the device information description unit in accordance with the description information,
   wherein the device information acquired by the information description unit and the device information acquired by the device information processing algorithm are integrated into the device information acquisition control unit.

2. The apparatus as claimed in claim 1, further comprising:
   a display data generation unit that receives the device information from the device information acquisition control unit and generates display data of the device information.

3. The apparatus as claimed in claim 2, wherein the display data generation unit generates display data in which the device information acquired by the information description unit in accordance with the description information and the device information acquired by the device information processing algorithm are displayed in the same display area.

4. The apparatus as claimed in claim 1, wherein the device information description unit is defined using a device description and the device information processing algorithm is defined using the device type manager.

5. A field device management system comprising:
   the field device management apparatus as claimed in claim 1; and
   the field device that communicates with the field device management apparatus through a communication path.

6. A computer-readable medium having a computer program stored thereon and readable by a computer,
   the computer program, when executed by the computer, causes the computer to perform operations which the field device management apparatus as claimed in claim 1 performs.

7. The apparatus as claimed in claim 1, wherein
   the device information acquisition control unit is configured to process an application corresponding to one of the device information acquired by the information description unit and the device information acquired, by the device information processing algorithm.

8. The apparatus as claimed in claim 7, wherein
   the device information acquisition control unit is configured to process an application, corresponding to the device information acquired by the information description unit.

9. A field device management apparatus for acquiring and managing device information about a filed device, the apparatus comprising:
   a device information description unit having a description information that describes the device information;
   an user application processing unit having an activation processing algorithm that activates a device information processing algorithm at a device type manager for acquiring the device information from the field device; and
   a device information acquisition control unit that receives the activation processing algorithm from the user application processing unit and activates the device information processing algorithm that is at the device type manager using the activation processing algorithm so as to directly and not through the device information description unit acquire the device information, wherein the device information acquisition control unit acquires the device information by the device information description unit in accordance with the description information, and
   wherein the device information acquired by the information description unit and the device information acquired by the device information processing algorithm are integrated into the device information acquisition control unit.

10. A field device management apparatus for acquiring and managing device information about a field device, the apparatus comprising:
   a device information description unit having,
      an activation processing algorithm that activates a device information processing algorithm at a device type manager for acquiring the device information from the field device; and
      a description information that describes the device information, and a device information acquisition control unit that activates the device information processing algorithm that is at the device type manager using the activation processing algorithm so as to acquire the device information through the device information description unit, wherein the device information acquisition control unit acquires the device information by the device information description unit in accordance with the description information;

a display data generation unit that receives the device information from the device information acquisition control unit and generates display data of the device information, wherein the display data of the device information generated by the display data generation unit is displayed by a display unit in one of display forms of the device information acquired by the information description unit and the device information acquired by the device information processing algorithm.

* * * * *